United States Patent
Hsieh et al.

(10) Patent No.: US 12,134,159 B2
(45) Date of Patent: Nov. 5, 2024

(54) WORKPIECE ORIENTATION MECHANISM

(71) Applicant: HIWIN TECHNOLOGIES CORP., Taichung (TW)

(72) Inventors: Chen-Yu Hsieh, Taichung (TW); Jhao-Jhong Su, Taichung (TW); Bo-Chen Lin, Taichung (TW); Kuo-Cheng Huang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 595 days.

(21) Appl. No.: 17/305,015

(22) Filed: Jun. 29, 2021

(65) Prior Publication Data

US 2022/0241917 A1 Aug. 4, 2022

(30) Foreign Application Priority Data

Feb. 3, 2021 (TW) ................. 110103966

(51) Int. Cl.
*B23Q 3/18* (2006.01)
*B26D 3/08* (2006.01)

(52) U.S. Cl.
CPC ....... *B23Q 3/18* (2013.01); *B26D 3/08* (2013.01)

(58) Field of Classification Search
CPC . Y10T 409/305824; Y10T 409/305656; Y10T 29/530395; Y10T 29/53039; Y10T 29/49902; Y10T 29/49901; Y10T 29/49899; Y10T 29/49897; Y10T 29/49895; G05B 19/27–39; G05B 2219/50151–50153; G05B 2219/50052–50053;

(Continued)

(56) References Cited

U.S. PATENT DOCUMENTS 3,885,295 A * 5/1975 Engelberger ........... G05B 19/27
901/45

FOREIGN PATENT DOCUMENTS

CN 211163164 U 8/2020
JP H03121738 A 5/1991
(Continued)

OTHER PUBLICATIONS

Machine Translation of JP H0593725 ('725 translation) (Year: 1993).*

*Primary Examiner* — Steven M Cernoch
*Assistant Examiner* — Jonathan R Zaworski
(74) *Attorney, Agent, or Firm* — Wang Law Firm, Inc.

(57) ABSTRACT

A workpiece orientation mechanism includes: a driving device including a transmission motor and a controller which are connected with each other via signal, the transmission motor defining an axial direction; a rotating seat, combined with the transmission motor, and capable of being driven to rotate by the transmission motor; an orientation head disposed on the rotating seat to rotate synchronously with the rotating seat, wherein the orientation head is capable of moving along the axial direction relative to the rotating seat, one end of the orientation head includes a mounting head, and a blocking member is disposed on the orientation head; reset means, arranged between the rotating seat and the orientation head, and positioning the orientation head at a predetermined position; and a sensor facing the blocking member, wherein the sensor is signally connected with the controller.

10 Claims, 17 Drawing Sheets

(58) Field of Classification Search
CPC .................. G05B 2219/50047–50049; G05B
2219/45212; G05B 2219/45124–45165;
G05B 2219/45091; G05B
2219/45087–45088; G05B 2219/45083;
G05B 2219/45063–45067; G05B
2219/35316; G05B 2219/35306; B44B
3/065; B44B 5/026; B44B 5/024; B44B
5/022; B44B 2700/12; B23Q 1/76–763;
B23Q 1/36; B23Q 1/25–267; B23Q
3/186; B23Q 3/183; B23Q 3/18; B23Q
15/26; B23Q 15/14; B23Q 16/02–12;
B23Q 2716/08; B23Q 17/2291; B23P
19/10–12; B23P 19/002; B23P 19/006;
B25B 23/02; B25B 23/08–12; B25B
23/105–108; B23B 31/008; B23B 31/28;
B23B 2215/72; B23B 2231/0264; B23B
2231/0276; B26D 7/01; B26D 2007/013;
B25J 9/1687; B25J 13/088; B25J 13/086;
B21D 11/22; B21D 22/025; B05D
19/402; B05D 19/404
USPC ............ 29/234–235, 271–272, 281.1, 281.4,
29/282–283, 297, 407.09, 464–468;
269/47–52, 53, 63, 69, 70, 71–73; 279/5,
279/6, 14, 133, 141; 72/361, 367.1,
72/409.19, 419, 420; 414/754–784;
81/13, 55, 4; 901/41; 74/813 R–813 L,
74/5; 408/226; 33/569; 285/24
See application file for complete search history.

(56) References Cited

FOREIGN PATENT DOCUMENTS

JP        H0593725    * 12/1993
JP        H0593725 U    12/1993

* cited by examiner

WORKPIECE ORIENTATION MECHANISM

BACKGROUND

Field of the Invention

The present invention relates to a processing device, and more particular to a workpiece orientation mechanism.

Description of Related Art

The existing workpiece engraving technology is to engrave the customer's required trademarks, numbers, specifications and other graphics on the designated positions of the workpiece. However, there are many types of products, and the engraving needs of customers have changed greatly. The current method of adjusting and correcting angles on the old special equipment that requires manpower takes a long time, so there is a kind of workpiece orientation mechanism in the industry. The conventional workpiece orientation mechanism can refer to the Chinese utility Patent No. CN211163164U, which discloses a clamping mechanism and a grinding mechanism. The clamping mechanism is adjacent to the grinding mechanism and includes a rotating rod. The middle section of the rotating rod includes a fixed block. A rotating disk is rotatably connected between the fixed block and the rotating rod. The rotating rod includes a rotating handle at one end and a clamping block at the other end. The clamping block is used to clamp the workpiece to be processed. The left and right sides of the rotating disk are symmetrically provided with sliding notches and springs disposed in the sliding notches. One end of the each of the springs is against the sliding notch, and the other end is fixedly connected with a limit pin. The front end of the fixed block is provided with a limit slot matched with the limit pin, and one side of the limit pin is provided with a circular arc bevel.

When the user turns the rotating handle, the arc bevel of the limit pin is squeezed, and the spring is compressed by the limit pinto contract into the sliding notch, until the limit pin is reinserted into the limit slot on the other side, so that the tool is rotated 180 degrees to facilitate the grinding mechanism to grind the other side of the workpiece.

Although the aforementioned clamping mechanism can rotate the workpiece to fix the workpiece at a specific angle, this case uses a limit pin to fix the angle of the workpiece, and only one side of the limit pin is provided with an arc bevel, so that the rotating rod can only rotate in one direction. In addition, the clamping mechanism achieves the purpose of orientation through the cooperation of the limit pin and the limit slot, so the orientation angle is only two angles of 0 degrees and 180 degrees, and cannot be fine-tuned.

SUMMARY

The present invention provides an orientation mechanism capable of accurately positioning the processing angle of a workpiece.

To achieve the above object, a workpiece orientation mechanism provided by the invention comprises:

a driving device including a transmission motor and a controller which are connected with each other via signal, the transmission motor defining an axial direction;

a rotating seat, combined with the transmission motor, and capable of being driven to rotate by the transmission motor;

an orientation head disposed on the rotating seat to rotate synchronously with the rotating seat, wherein the orientation head is capable of moving along the axial direction relative to the rotating seat, one end of the orientation head includes a mounting head, and a blocking member is disposed on the orientation head;

reset means, arranged between the rotating seat and the orientation head, and positioning the orientation head at a predetermined position;

a sensor facing the blocking member, wherein the sensor is signally connected with the controller;

wherein, when a workpiece abuts the mounting head to move the orientation head and the blocking member along the axial direction, the sensor transmits a driving signal to the controller to drive the transmission motor, and the transmission motor drives the rotating seat, the orientation head, and the blocking member to rotate by a rotation angle, so that the mounting head engages the workpiece, meanwhile, the reset means causes the orientation head and the blocking member to return along the axial direction, and makes the sensor send the driving signal to the controller to stop the transmission motor, and the transmission motor sends a feedback parameter to the controller to obtain the rotation angle, and the controller calculates a compensation angle based on the rotation angle and a preset angle, and then drives the transmission motor to rotate by the compensation angle.

Accordingly, the present invention uses the orientation head to move along the axial direction to drive the blocking member to approach or move away from the sensing unit of the sensor, so as to make the sensing unit send a driving signal to the controller to turn on of turn off the transmission motor, so that the workpiece is smoothly sleeved on the mounting head. When the transmission motor is activated, a feedback parameter is sent to the controller to know a rotation angle of the transmission motor, and the controller receives the preset angle input from the outside and calculates the compensation angle according to the rotation angle and the preset angle, and then controls the transmission motor to rotate according to the compensation angle, so that the mounting head rotates to preset angle to accurately position the angle of workpiece.

DETAILED DESCRIPTION

Figure 1:
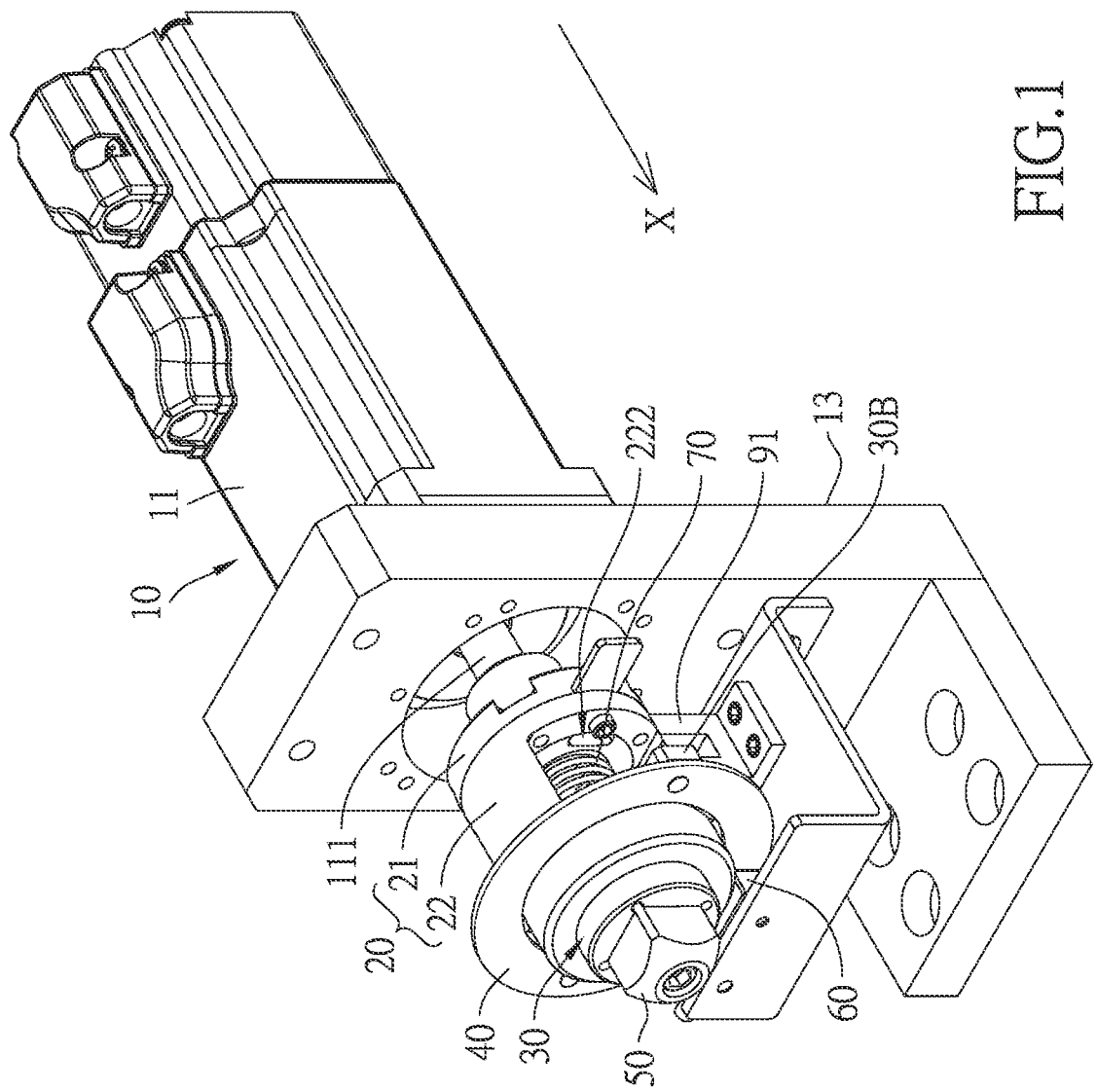
FIG. 1 is a perspective view of the first embodiment of the present invention.
Figure 2:
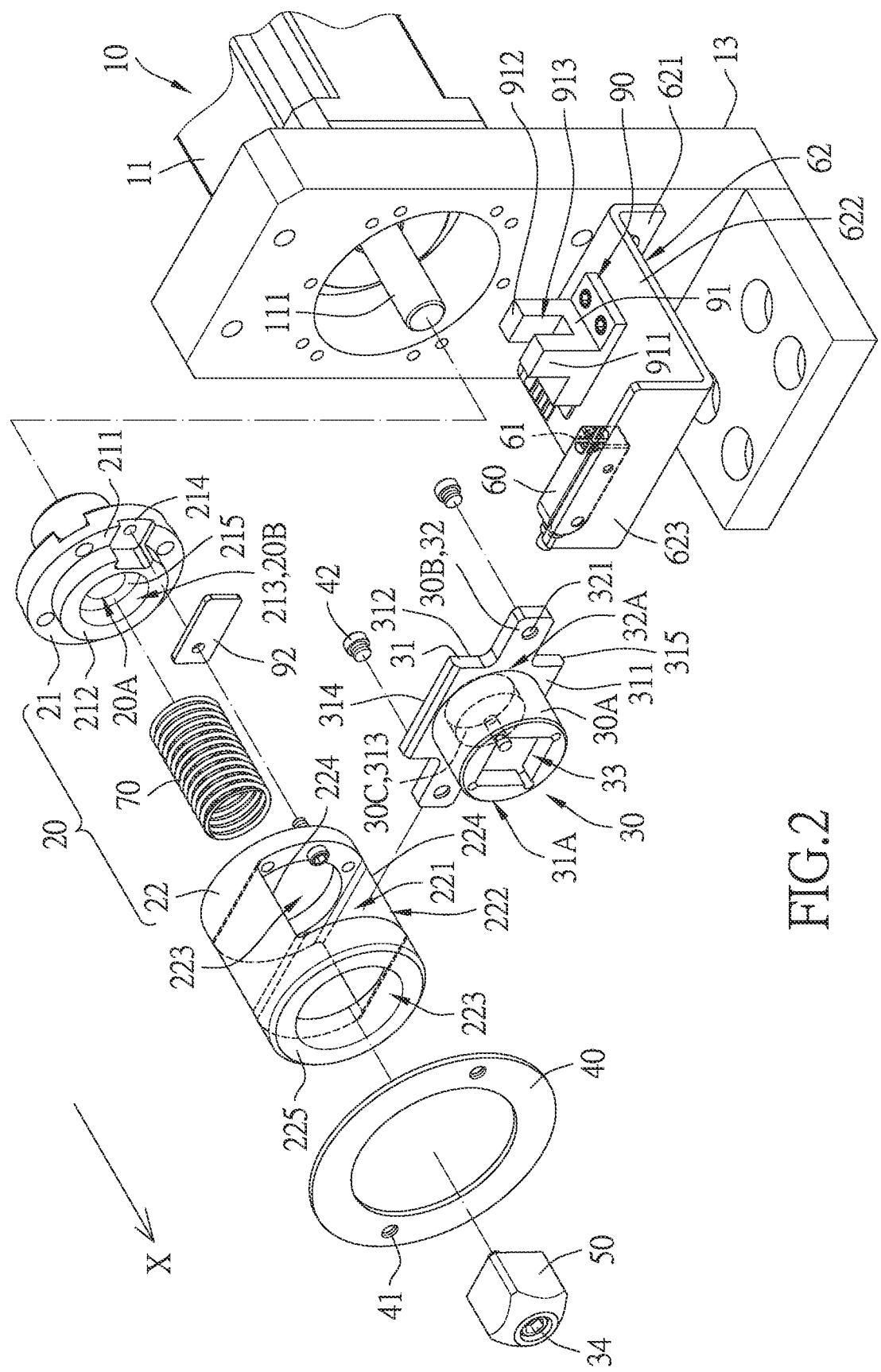
FIG. 2 is an exploded view of the first embodiment of the present invention.
Figure 3:
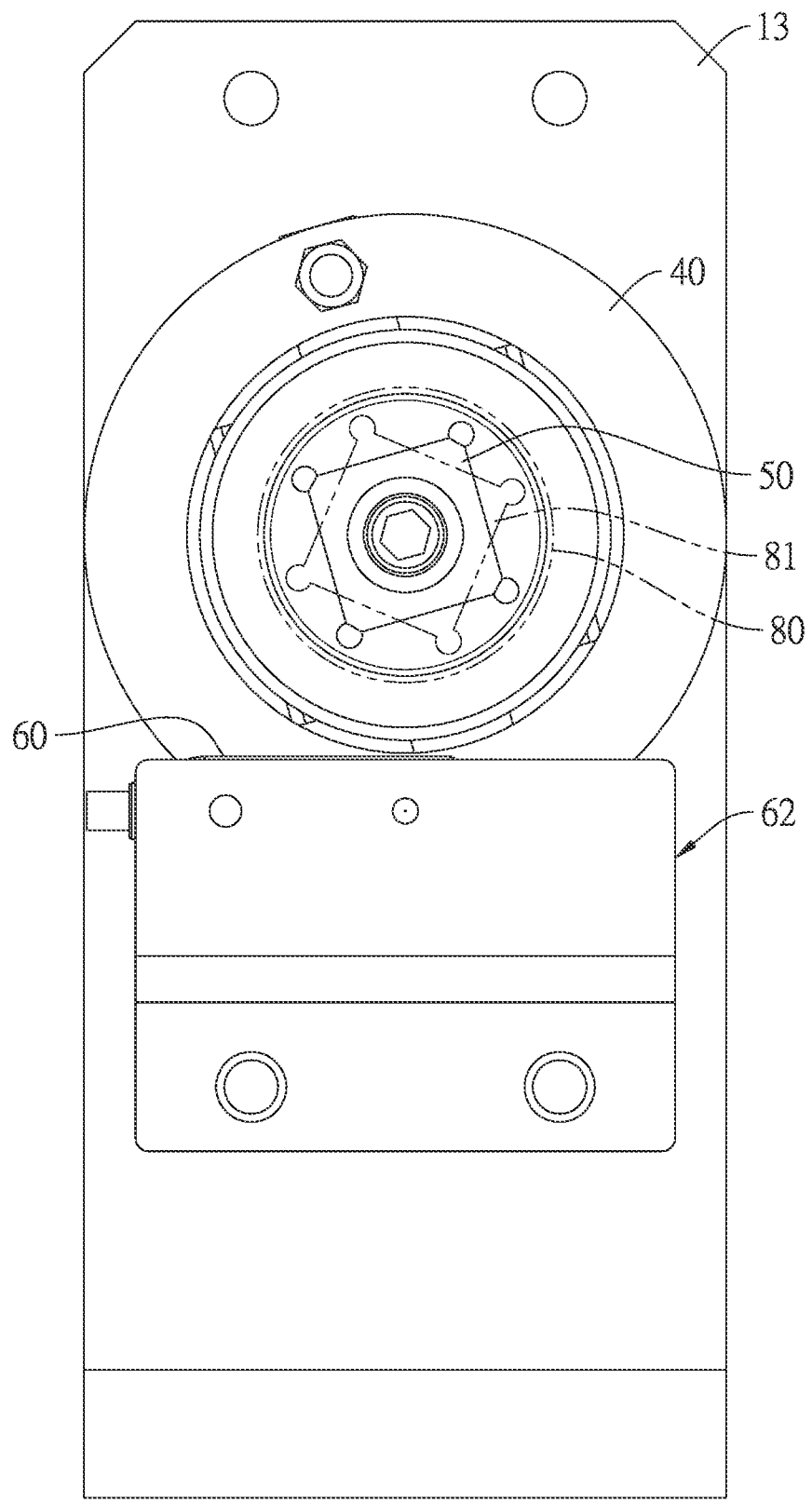
FIG. 3 is a schematic diagram of the operation of the first embodiment of the present invention.
Figure 4:
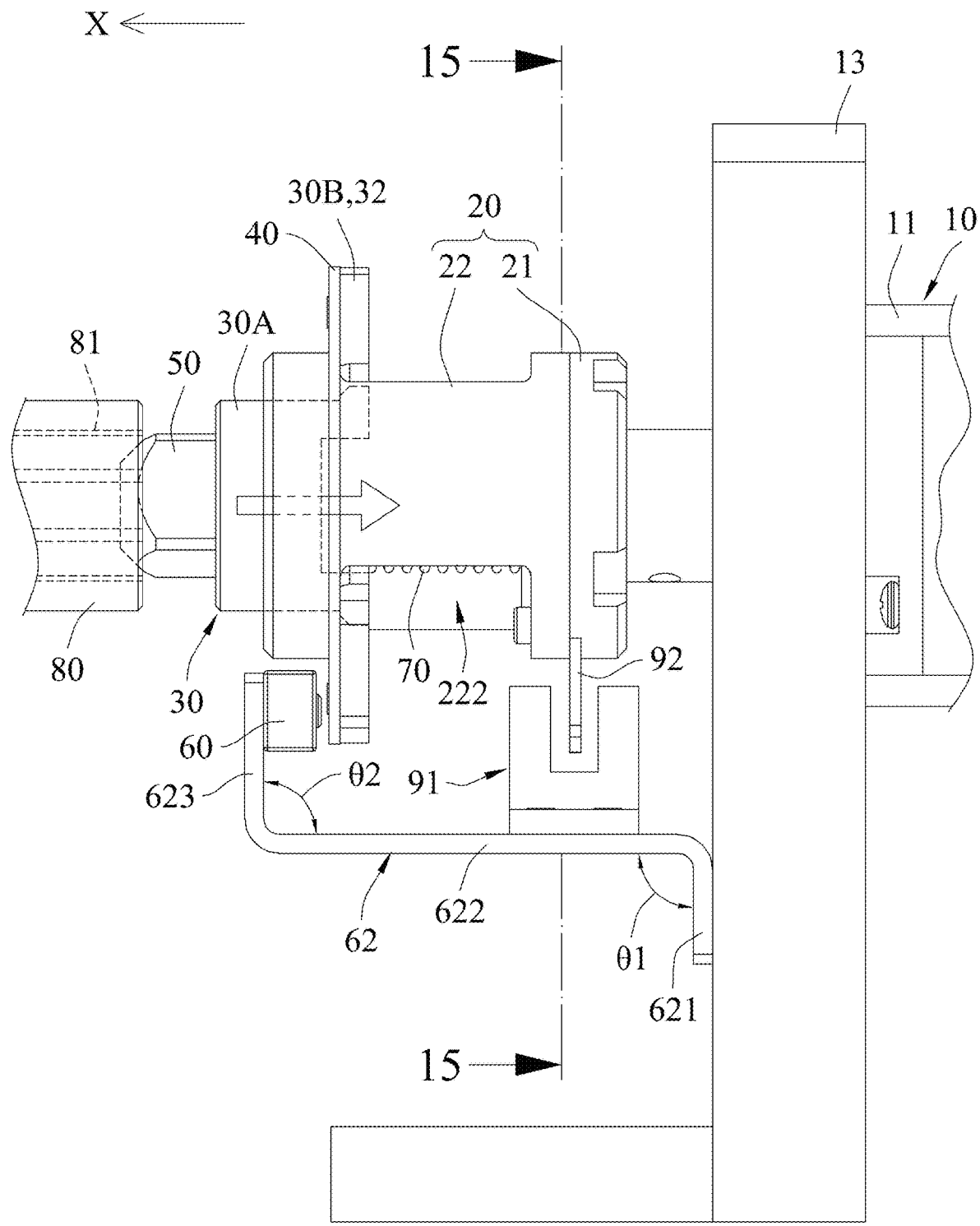
FIG. 4 is a schematic diagram of the operation of the first embodiment of the present invention.
Figure 5:
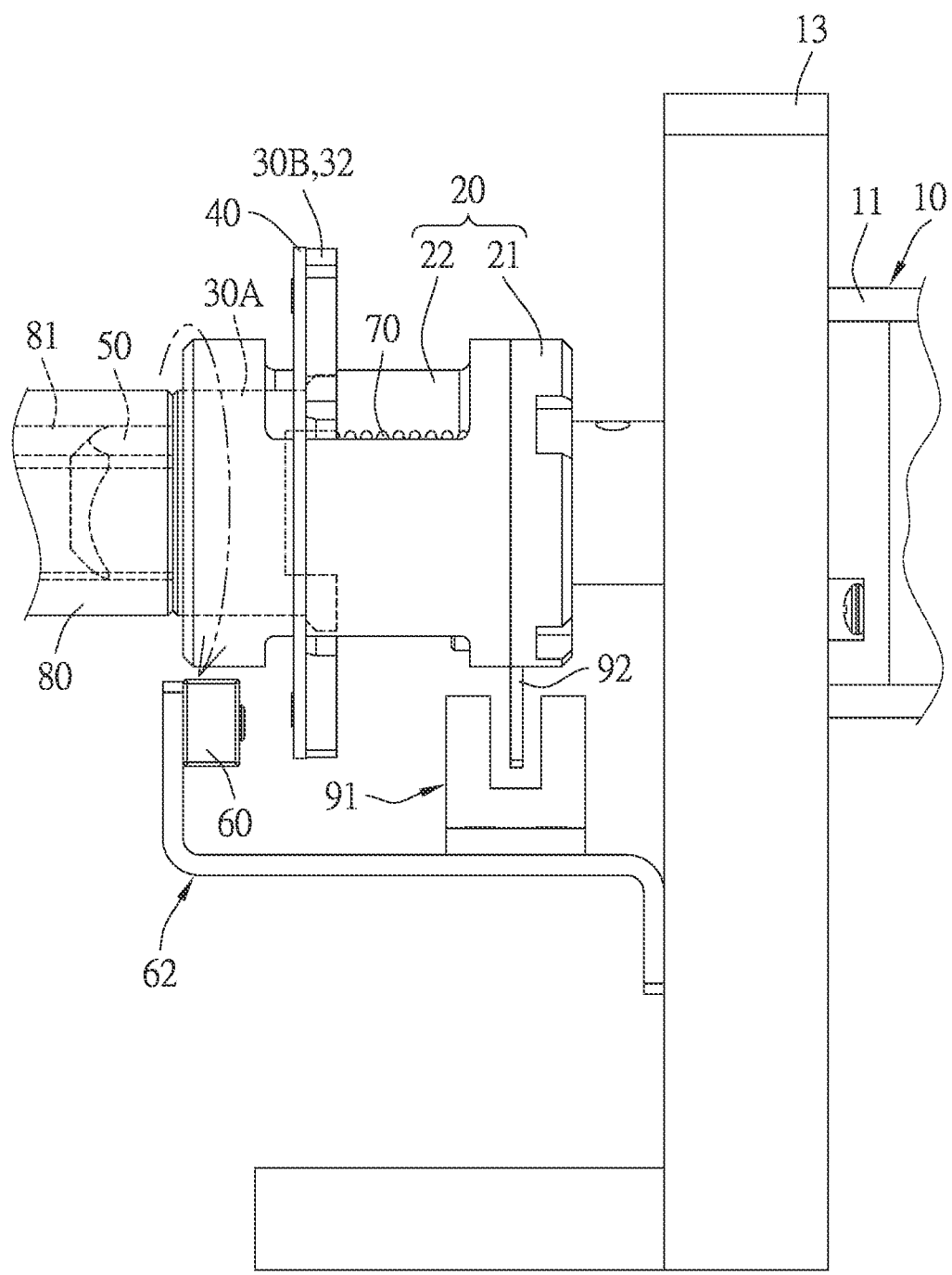
FIG. 5 is a schematic diagram of the operation of the first embodiment of the present invention.
Figure 6:
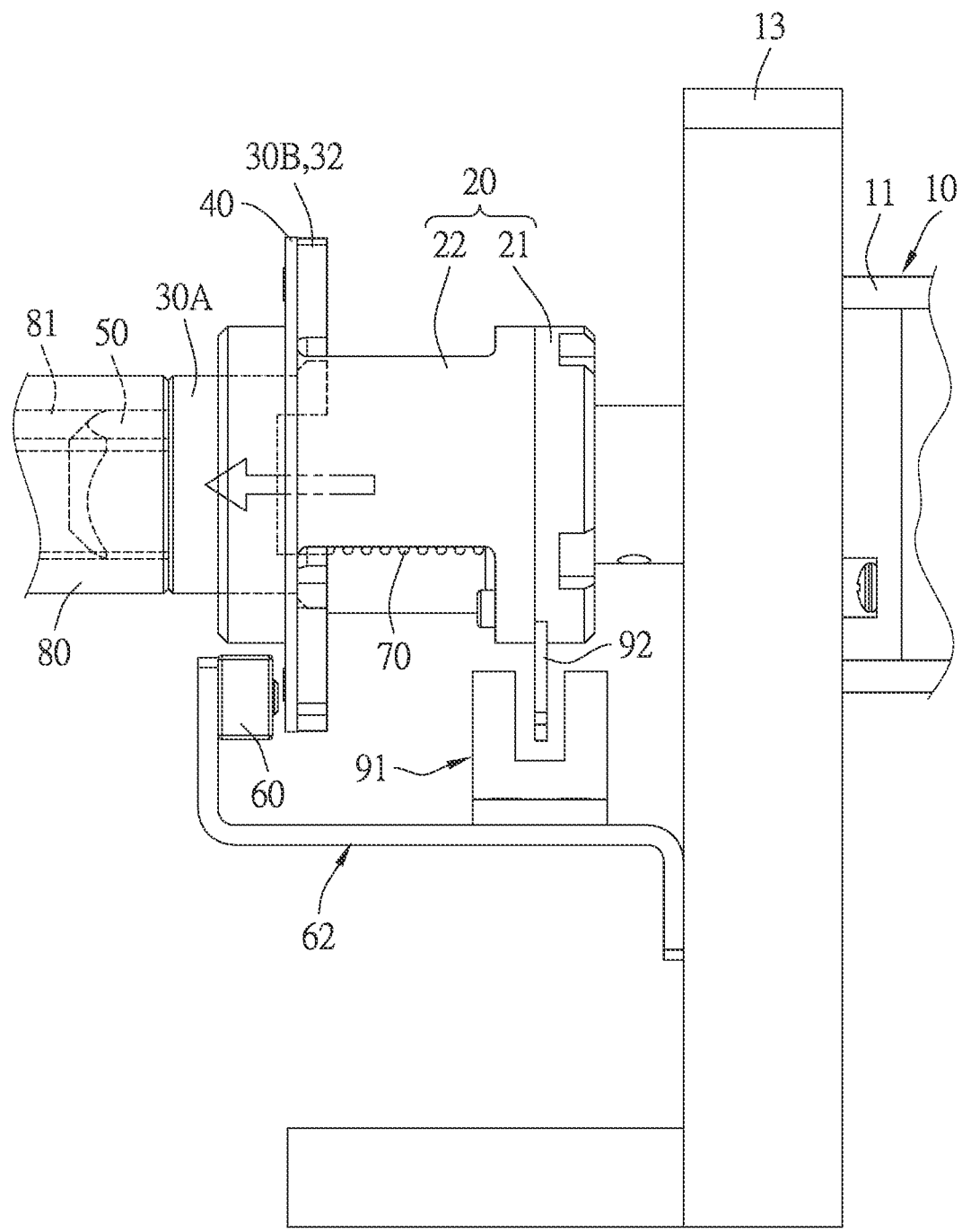
FIG. 6 is a schematic diagram of the operation of the first embodiment of the present invention.
Figure 7:
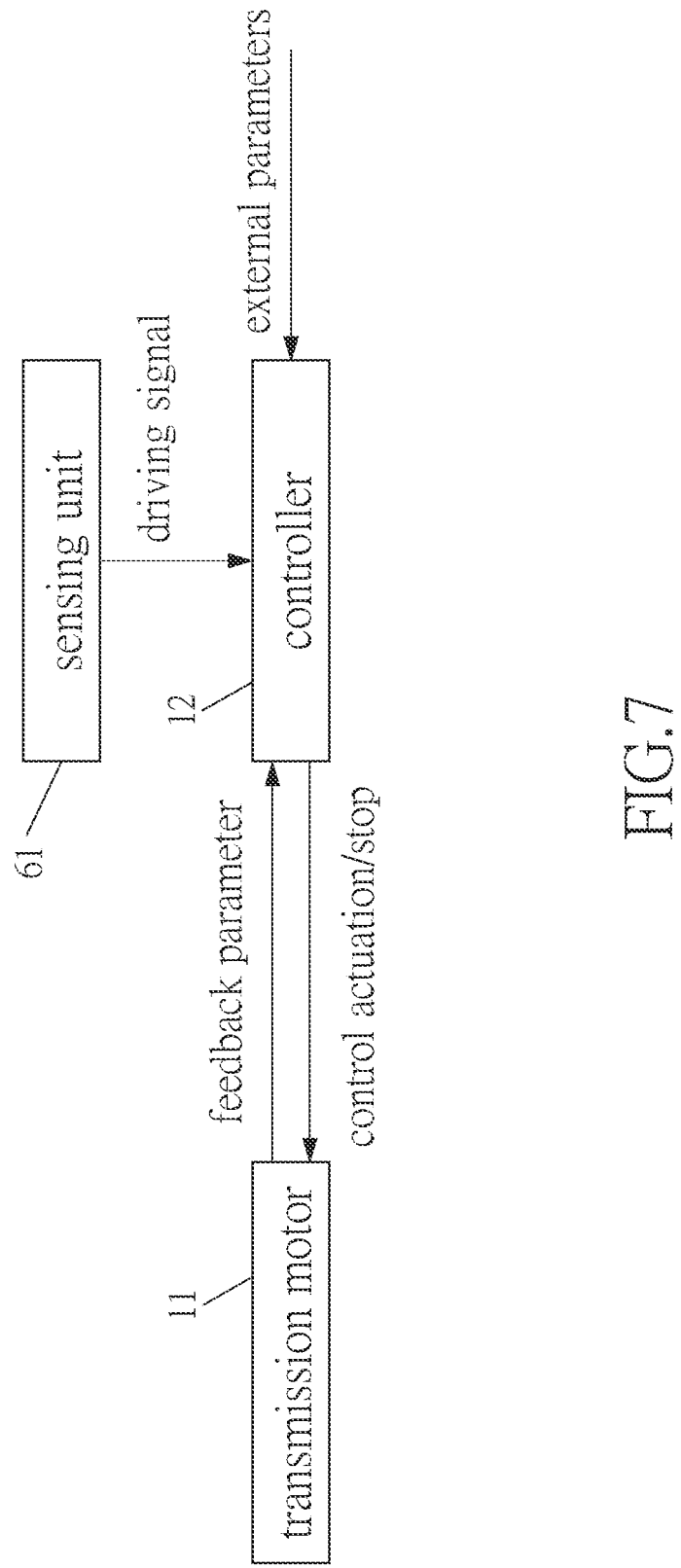
FIG. 7 is a schematic diagram of the signal connection between the controller, the transmission motor and the sensing unit of the present invention.
Figure 8:
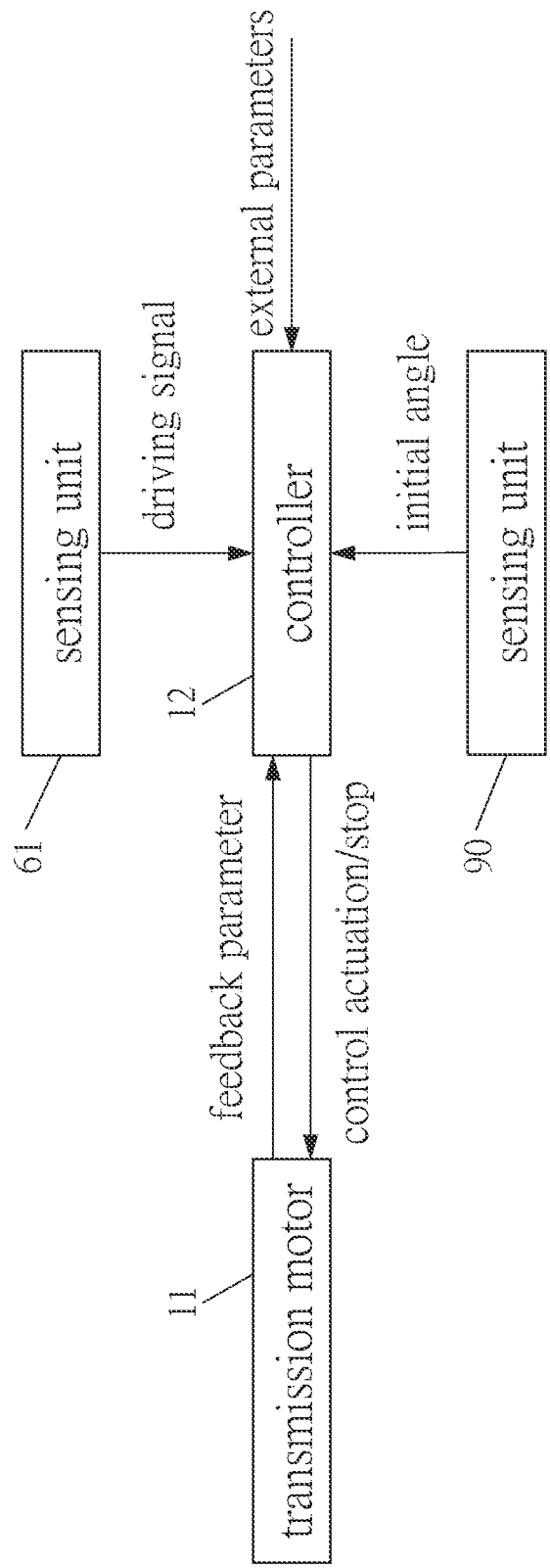
FIG. 8 is a schematic diagram of the signal connection between the controller and the angle sensing unit of the present invention.

The present invention will be clearer from the following description when viewed together with the accompanying drawings, which show, for purpose of illustrations only, the preferred embodiment in accordance with the present invention.

Referring to FIGS. 1-8, a first embodiment of the workpiece orientation mechanism disclosed in the present invention comprises:

A driving device 10, a rotating seat 20, an orientation head 30, a blocking member 40, a mounting head 50, a sensor 60, and an elastic member 70.

The driving device 10 includes a transmission motor 11 and a controller 12 which are connected with each other via signal. The transmission motor 11 is mounted on a motor fixing base 13 and includes a rotating shaft 111 which defines an axial direction X. In this embodiment, the controller 12 includes an absolute encoder.

The rotating seat 20 includes a penetrating hole 20A penetrating along the axial direction X, the rotating shaft 111 is inserted through and locked in the penetrating hole 20A, so that the rotating shaft 111 drives the rotating seat 20 to rotate. The rotating seat 20 includes an elastic member fixing portion 20B. One end of the elastic member 70 is fixed to the elastic member fixing portion 20B. In this embodiment, the rotating seat 20 includes a first sleeve 21 and a first orientation member 22.

The first sleeve 21 is sleeved on the rotating shaft 111, the penetrating hole 20A penetrates the first sleeve 21, so that the rotating shaft 111 drives the first sleeve 21 to rotate. The first sleeve 21 includes a first side surface 211, the first side surface 211 is the side facing away from the motor fixing base 13. The first side surface 211 includes a flange 212, and the flange 212 surrounds a first accommodating groove 213 which communicates with the penetrating hole 20A, and the diameter of the first accommodating groove 213 is larger than that of the penetrating hole 20A, thereby forming an annular step surface 215 at the junction between the first accommodating groove 213 and the penetrating hole 20A for one end of the elastic member 70 to abut against. In this embodiment, the first accommodating groove 213 is the elastic member fixing portion 20B.

The first orientation member 22 includes a body 225 coaxially arranged with the first sleeve 21, an elastic member accommodating hole 221, two through holes 223, and two openings 222. The body 225 has a cylindrical shape and is fixedly combined with the first side surface 211 of the first sleeve 21. The elastic member accommodating hole 221 penetrates the body 225 along the axial direction X, the two through holes 223 are formed at two ends of the body 225 in the axial direction X, and the two openings 222 are respectively formed at two radial ends of the body 225 and communicate with the elastic member accommodating hole 221.

The orientation head 30 is disposed on the rotating seat 20 and can rotate synchronously with the rotating seat 20. The orientation head 30 includes a locking portion 30A, a sliding portion 31, a blocking-member coupling portion 30B, and an elastic member receiving portion 30C. The locking portion 30A is a cylindrical body and extending along the axial direction X, and the two ends of the locking portion 30A along the axial direction X are respectively a first end 31A and a second end 32A. The first end 31A of the locking portion 30A extends from the through hole 223 and protrudes from the first orientation member 22, and the first end 31A is provided with the mounting head 50. The sliding portion 31 is formed at the second end 32A of the locking portion 30A and is generally a rectangular sheet body. The sliding portion 31 includes a front side surface 311 and a rear side surface 312 facing away from the front side surface 311. The front side surface 311 is connected to the second end 32A of the locking portion 30A. The sliding portion 31 is disposed in the elastic member accommodating hole 221, the blocking-member inductor coupling portion 30B is used for coupling the blocking member inductor 40, and the blocking-member coupling portion 30B is two protrusions 32 at two opposite sides of the sliding portion 31. The two protrusions 32 are located on the radial extension line of the locking portion 30A and respectively protrude from the openings 222 on two radial sides of the first orientation member 22. The two protrusions 32 each include a first locking hole 321. The elastic member receiving portion 30C is used to fix the other end of the elastic member 70. The elastic member receiving portion 30C is a second accommodating groove 313 located on the rear side surface 312.

The mounting head 50 is used to fix a workpiece 80. The workpiece 80 includes a groove 81. The mounting head 50 is inserted into the groove 81. In this embodiment, the mounting head 50 is a joint, the workpiece 80 is a sleeve which is sleeved on the joint, the groove 81 is a square groove, and the mounting head 50 is a square joint, so allow the workpiece to rotate synchronously with the joint.

In this embodiment, the first end 31A of the locking portion 30A includes a receiving slot 33, the receiving slot 33 is a square slot, the mounting head 50 is disposed in the receiving slot 33, and a bolt 34 is inserted in the mounting head 50 to lock the mounting head 50 in the receiving slot 33, so that the user can replace the mounting head 50 for different types of workpieces 80.

The blocking member 40 is combined with the blocking-member coupling portion 30B of the orientation head 30 so as to be able to move along the axial direction X with the orientation head 30. In this embodiment, the blocking member 40 is an annular plate sleeved on the first orientation member 22. The blocking member 40 includes two second locking holes 41 which are aligned with the two first locking holes 321, and a bolt 42 is inserted through each pair of the first locking holes 321 and the second locking holes 41.

The sensor 60 is a distance sensor and includes a sensing unit 61 that faces the blocking member 40, and the sensing unit 61 is signally connected to the controller 12. In this embodiment, the driving device 10 further includes a supporting plate 62 which is locked to the motor fixing base 13, and the supporting plate 62 includes a first plate section 621, a second plate section 622, and a third plate section 623 which are connected to each other in sequence. The extension directions of the first plate section 621 and the second plate section 622 are generally perpendicular, a first angle θ1 is formed between the first plate section 621 and the second plate section 622, and the first angle θ1 is 90 degrees. The extension directions of the second plate section 622 and the third plate section 623 are generally perpendicular, a second angle θ2 is formed between the second plate section 622 and the third plate section 623, and the second angle θ2 is 90 degrees. The first plate section 621 is locked to the motor fixing base 13, the third plate section 623 faces the blocking member 40, and the sensor 60 is combined with the third plate section 623.

The elastic member 70 is disposed in the elastic member accommodating hole 221, the elastic member 70 is a spring. One end of the elastic member 70 extends into the first accommodating groove 213 and abuts against the annular step surface 215, another end of the elastic member 70 abuts in the second accommodating groove 313 to drive the orientation head 30 to move along the axial direction X.

In this embodiment, the elastic member accommodating hole 221 includes two opposite inner surfaces 224 which are respectively formed on two radial sides of the body 225. The two inner surfaces 224 are flat surfaces. The sliding portion 31 includes a top fixing side portion 314 and a bottom fixing side portion 315 on opposite sides thereof. The top fixing side portion 314 and the bottom fixing side portion 315 are located along the radial extension of the locking portion 30A, the top fixing side portion 314 and the bottom fixing side portion 315 are flat surfaces, and respectively abut against the corresponding inner surfaces 224, so that the orientation head 30 can rotate synchronously with the first orientation member 22 and can move along the axial direction X in the first orientation member 22.

In another embodiment, when the controller 12 applied to the transmission motor 11 includes an incremental encoder, the invention further includes an angle sensor unit 90, and the angle sensor unit 90 includes an angle sensor 91 and an angle sensing member 92. The angle sensor 91 is disposed on the second plate section 622 and is an optical sensor. The angle sensor 91 is signally connected to the controller 12, and includes a light projecting unit 911 and a light receiving unit 912. The light projecting unit 911 and the light receiving unit 912 are separated by a distance to form a shielding space 913. The angle sensing member 92 is a rectangular plate disposed between the first sleeve 21 and the first orientation member 22. The first sleeve 21 is recessed with a receiving groove 214 on the first side surface 211, and the angle sensing member 92 is locked in the receiving groove 214 and can rotate with the rotating seat 20. When the angle sensing member 92 passes through the shielding space 913, the angle sensor 91 is driven to obtain an initial angle; to further illustrate, the angle sensor 91 detects the angle at which the angle sensing member 92 enters the shielding space 913 and the angle at which it leaves the shielding space 913, so as to calculate the initial angle.

It is worth mentioning that in other preferred embodiments, the support plate 62 may not be provided, and the angle sensor 91 and the sensor 60 or one of the foregoing two can be disposed on the machine equipment near the transmission motor 11 as long as they can correspond to the angle sensing member 92 and the blocking member 40 respectively.

Figure 11:
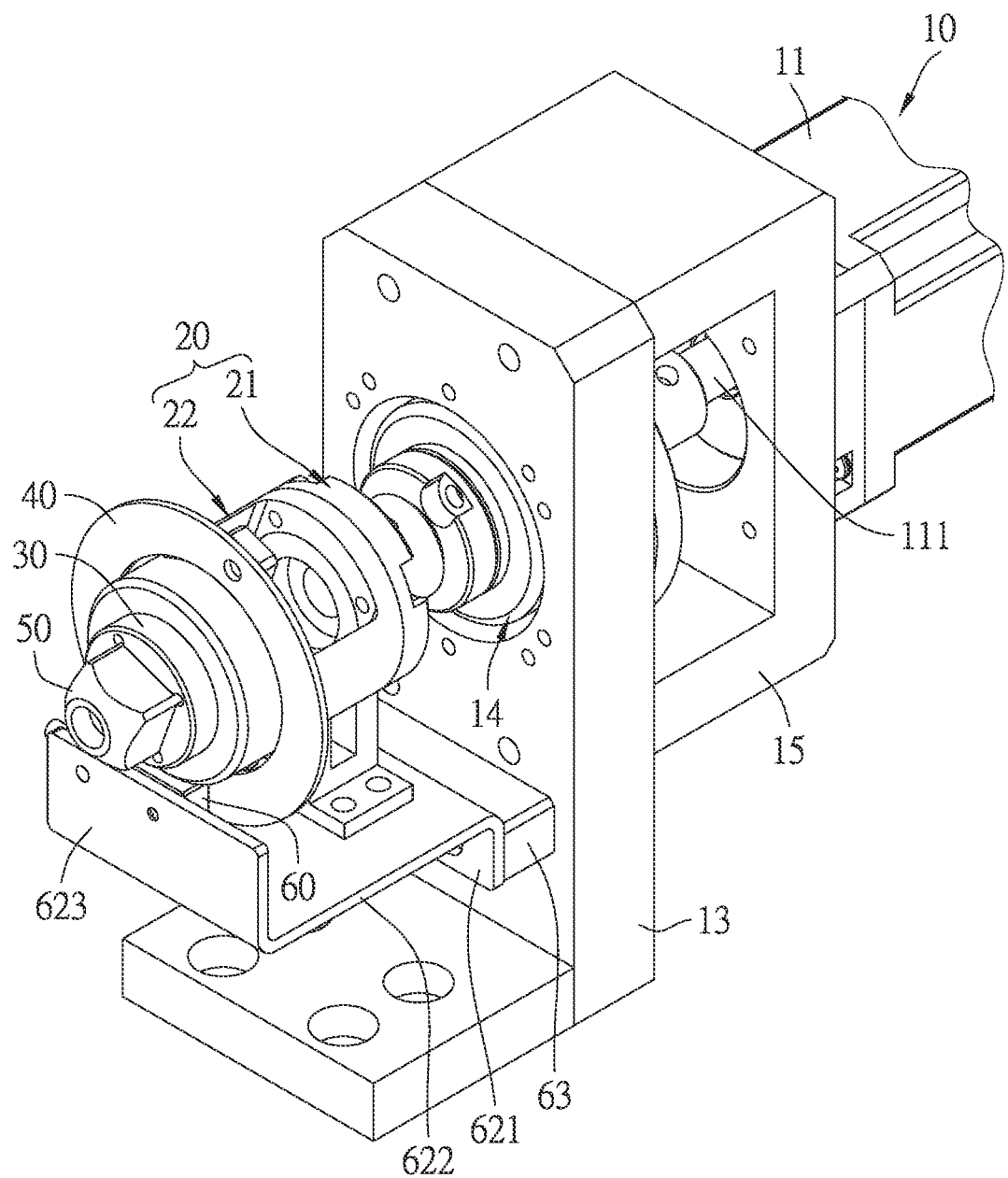
FIG. 11 is a perspective view of a preferred embodiment of the present invention.
Figure 12A:
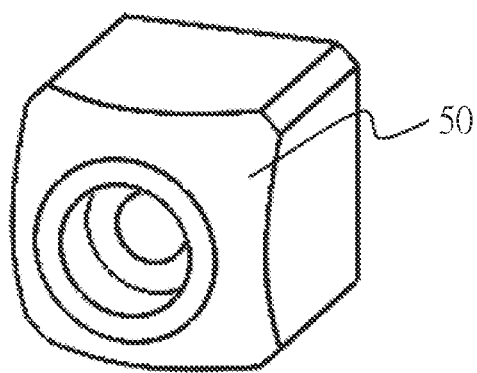
FIG. 12A is a three-dimensional view of different types of mounting heads of the present invention.
Figure 12B:
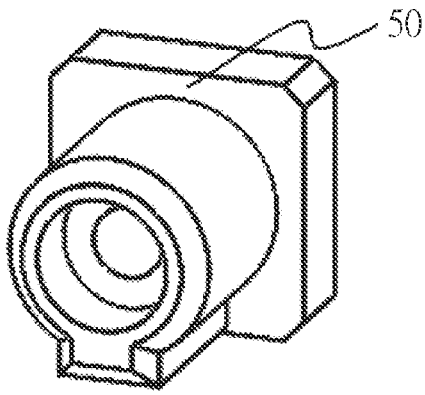
FIG. 12B is a perspective view of different types of mounting heads of the present invention.
Figure 12C:
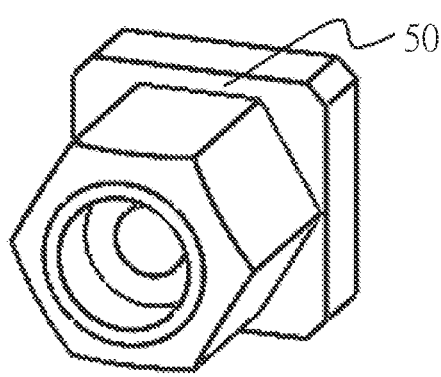
FIG. 12C is a perspective view of different types of mounting heads of the present invention.
Figure 12D:
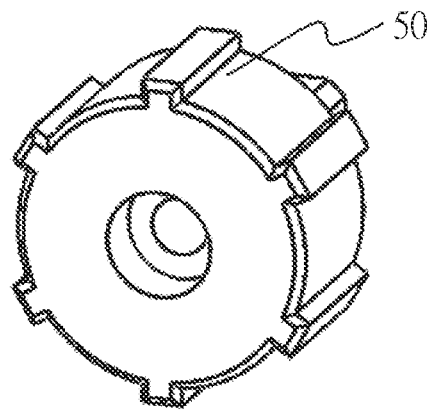
FIG. 12D is a perspective view of different types of mounting heads of the present invention.
Figure 13A:
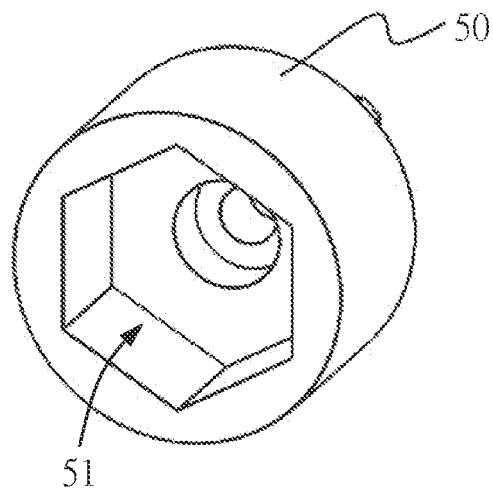
FIG. 13A is a perspective view of different types of mounting heads of the present invention.
Figure 13B:
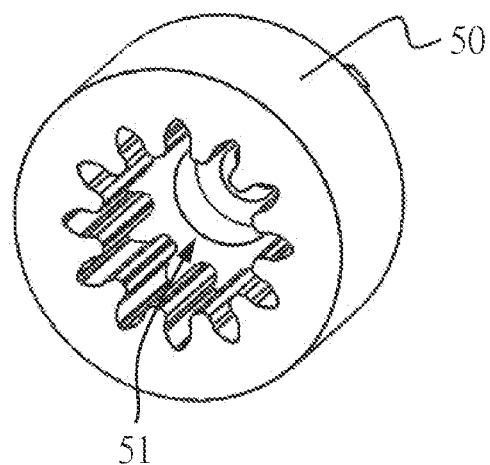
FIG. 13B is a perspective view of different types of mounting heads of the present invention.
Figure 13C:
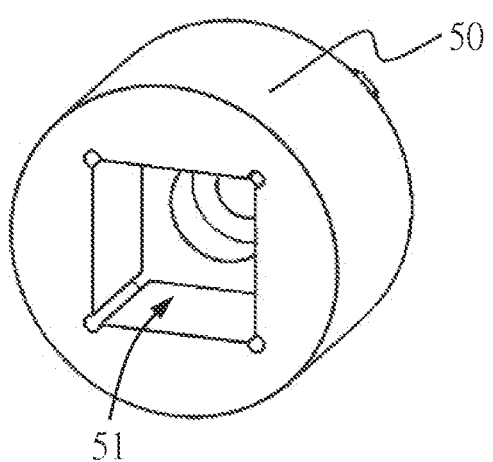
FIG. 13C is a perspective view of different types of mounting heads of the present invention.
Figure 13D:
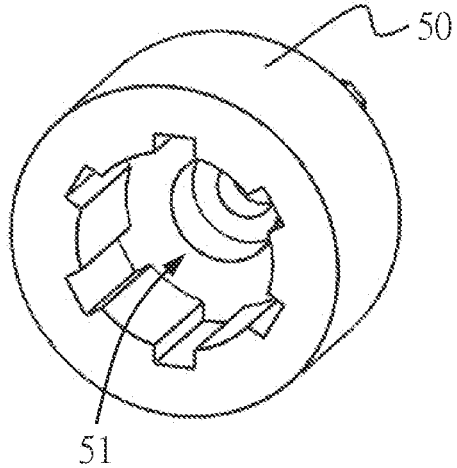
FIG. 13D is a perspective view of different types of mounting heads of the present invention.

In other preferred embodiments, please refer to FIG. 11, which further includes a spacer 63, which is fixed between the first plate section 621 and the motor fixing base 13, so as to adjust the distance between the sensor 60 and the blocking member 40.

In the preferred embodiment, please refer to FIG. 11, a reducer 14 is additionally installed between the transmission motor 11 and the rotating seat 20, and a reducer base 15 is also provided and combined with the motor fixing base 13, and the reducer 14 and the transmission motor 11 are disposed on the reducer base 15.

Figure 9:
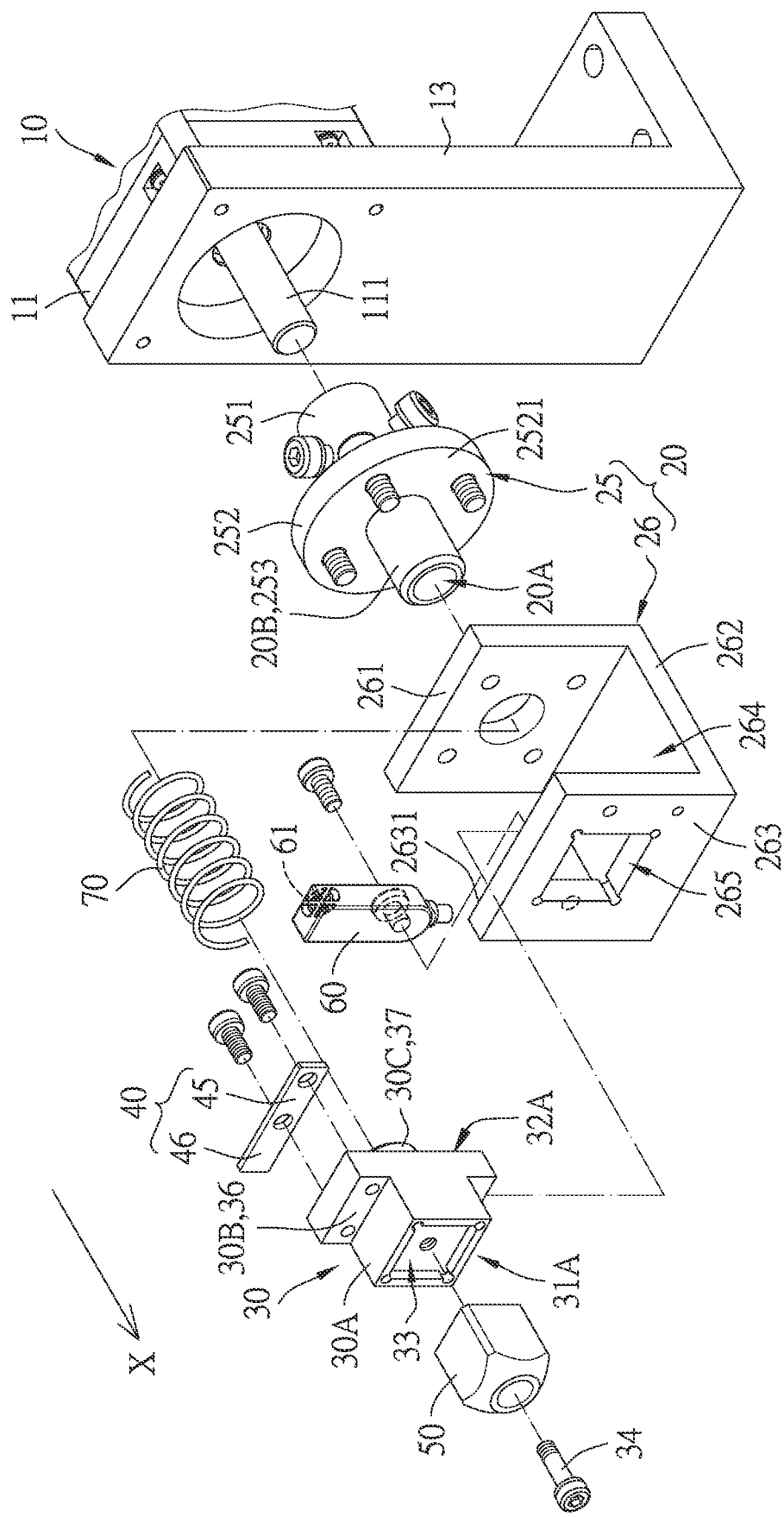
FIG. 9 is an exploded view of the second embodiment of the present invention.
Figure 10A:
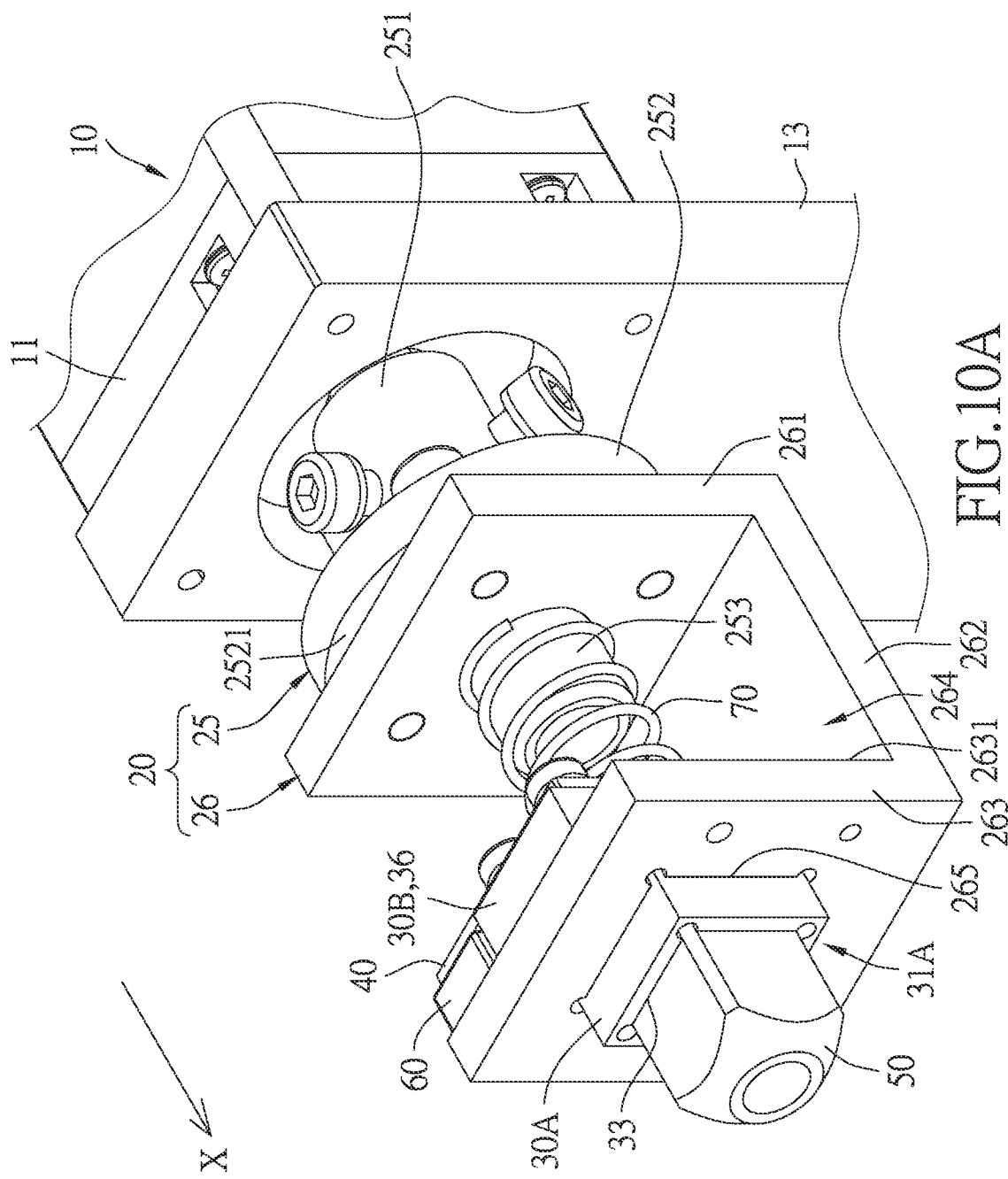
FIG. 10A is a perspective view of the second embodiment of the present invention.
Figure 10B:
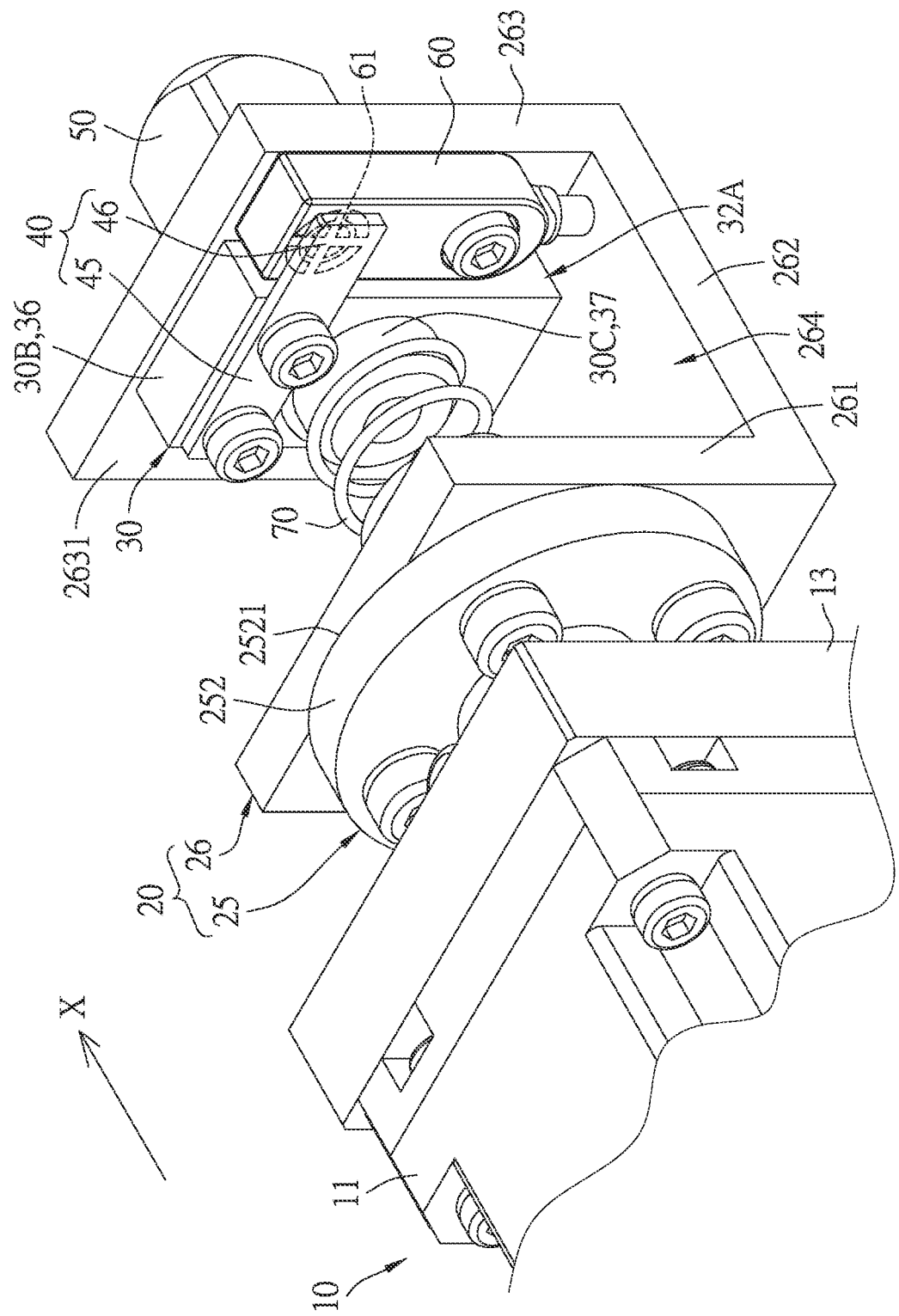
FIG. 10B is a perspective view of the second embodiment of the present invention from another perspective.

The second embodiment of the workpiece orientation mechanism of the present invention, please refer to FIGS. 9 to 10B, comprises:

A driving device 10, a rotating seat 20, an orientation head 30, a blocking member 40, a mounting head 50, a sensor 60 and an elastic element 70.

The driving device 10 includes a transmission motor 11 and a controller 12 which are connected with each other via signal. The transmission motor 11 is mounted on a motor fixing base 13 and includes a rotating shaft 111 which defines an axial direction X. In this embodiment, the controller 12 includes an absolute encoder.

The rotating seat 20 includes a penetrating hole 20A penetrating along the axial direction X, the rotating shaft 111 is inserted through and locked in the penetrating hole 20A, so that the rotating shaft 111 drives the rotating seat 20 to rotate. The rotating seat 20 includes an elastic member fixing portion 20B. One end of the elastic member 70 is fixed to the elastic member fixing portion 20B. In this embodiment, the rotating seat 20 includes a second sleeve 25 and a second orientation member 26.

The second sleeve 25 is sleeved on the rotating shaft 111, and the penetrating hole 20A penetrates the second sleeve 25. The second sleeve 25 includes a sleeve portion 251, a body portion 252, and a first column 253. The body portion 252 is a circular plate. The sleeve portion 251 and the first column 253 are both cylindrical and are respectively connected to two opposite side of the body portion 252 along the axial direction X, and the sleeve portion 251 is sleeved on the rotating shaft 111, so that the rotating shaft 111 drives the second sleeve 25 to rotate. The body portion 252 includes a second side surface 2521 which is the side facing away from the motor fixing base 13, the first column 253 is connected to the second side surface 2521, the first column 253 is the elastic member fixing portion 20B, and one end of the elastic member 70 is sleeved on the first column 253.

The second orientation member 26 includes a first side plate 261, a bottom plate 262, and a second side plate 263 which are connected to one another in sequence. The bottom plate 262 is located between the first side plate 261 and the second side plate 263, a vertical angle is formed between the first side plate 261 and the bottom plate 262 and between the bottom plate 262 and the second side plate 263, the first side plate 261 and the second side plate 263 are parallel to each other and face each other, so that the second orientation member 26 is generally U-shaped. The first side plate 261, the bottom plate 262, and the second side plate 263 define an accommodating space 264, and the first column 253 penetrates the first side plate 261 and extends into the accommodating space 264. The first side plate 261 is locked and combined with the body portion 252, and the second orientation member 26 can rotate synchronously with the second sleeve 25. The second side plate 263 includes a mounting head hole 265, and the second side plate 263 includes a mounting surface 2631 which faces the first side plate 261.

The orientation head 30 is disposed on the second orientation member 26 of the rotating seat 20 and rotates synchronously with the rotating seat 20. The orientation head 30 includes a locking portion 30A, a blocking-member coupling portion 30B, and an elastic member receiving portion 30C. The locking portion 30A is a square column and includes a first end 31A and a second end 32A opposite to each other. The first end 31A of the locking portion 30A extends out of the second orientation member 26 via the mounting head hole 265. The first end 31A is provided with the mounting head 50. The blocking-member coupling portion 30B is provided for coupling the blocking-member 40 and located at the second end 32A. The blocking-member coupling portion 30B is a locking block 36 extending from one side of the locking portion 30A, and the elastic member receiving portion 30C is located at the second end 32A. Another end of the elastic member 70 is fixed to the elastic member receiving portion 30C, and the elastic member receiving portion 30C is a second column 37 protruding from the second end 32A.

In this embodiment, the first end 31A of the locking portion 30A includes a receiving slot 33 which is a square slot, the mounting head 50 is a square joint and disposed in the receiving slot 33, and a bolt 34 is inserted through the mounting head 50 to lock the mounting head 50 in the receiving slot 33, so that the user can replace the mounting head 50 for different types of workpieces 80.

The mounting head 50 is used to fix a workpiece 80. The workpiece 80 includes a groove 81. The mounting head 50 is inserted into the groove 81. In this embodiment, the mounting head 50 is a joint, the workpiece 80 is a sleeve which is sleeved on the joint, the groove 81 is a square groove, and the mounting head 50 is a square joint, so allow the workpiece to rotate synchronously with the joint.

The blocking member 40 is combined with the blocking-member coupling portion 30B so as to be able to move along the axial direction X with the orientation head 30. In this embodiment, the blocking member 40 is a rectangular plate and includes a locking section 45 and a shielding section 46 connected to each other, the locking section 45 is attached and locked to the locking block 36, and the shielding section 46 faces the sensor 60.

The sensor 60 is locked to the mounting surface 2631. The sensor 60 is a distance sensor, and includes a sensing unit 61 signally connected to the controller 12, and the shielding section 46 faces the sensing unit 61.

The elastic member 70 is disposed in the accommodating space 264, the elastic member 70 is a spring, one end of the elastic member 70 is sleeved on the first column 253, and another end of the elastic member 70 is sleeved on the second column 37 to drive the orientation head 30 to move along the axial direction X.

Figure 14:
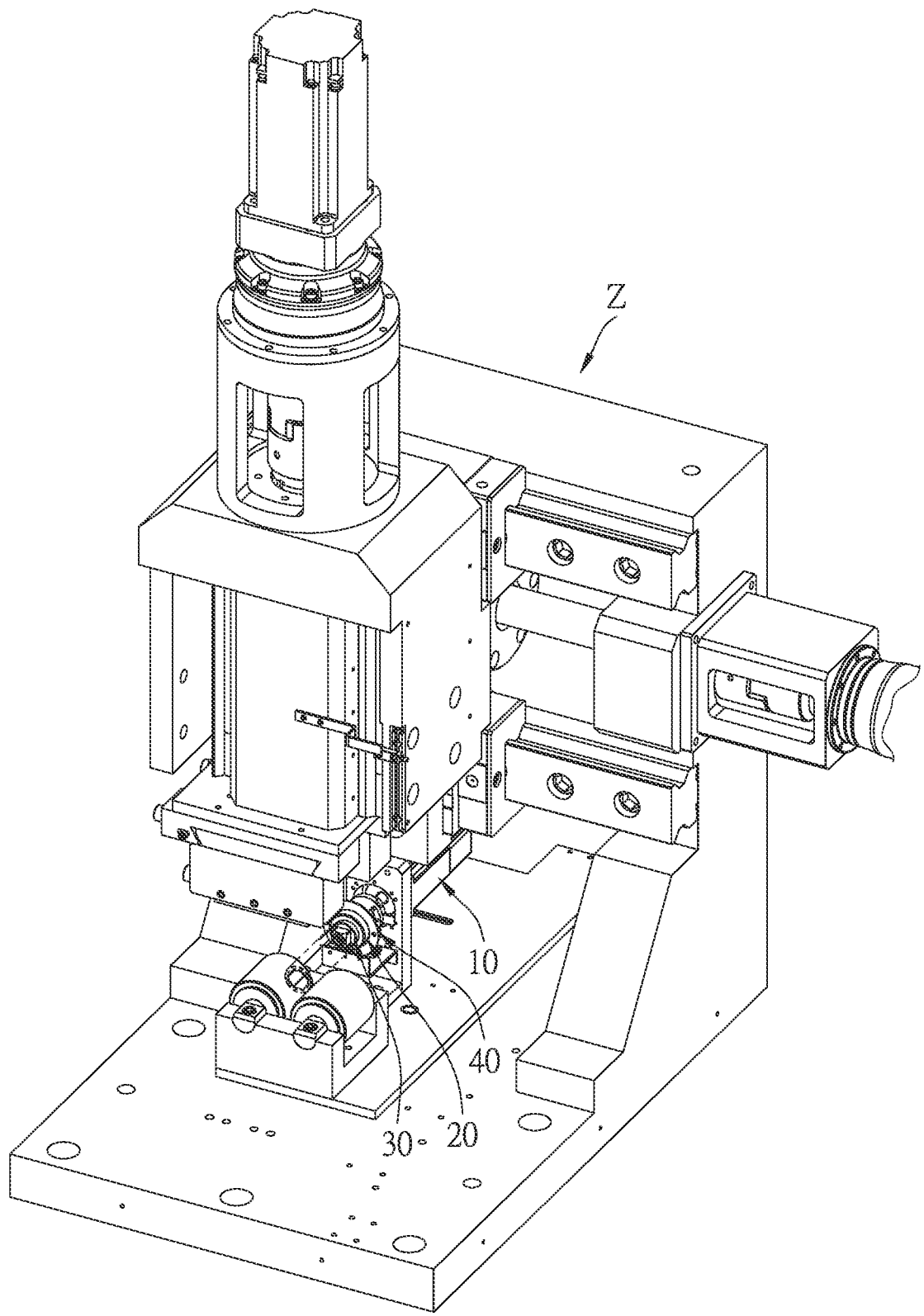
FIG. 14 is a schematic diagram of the present invention installed in a processing machine.

Preferably, please refer to FIG. 14, the workpiece orientation mechanism of the present invention is further mounted on a processing machine Z.

In other embodiments, please refer to FIGS. 12A to 13D, the mounting head 50 can be of various types. Please refer to FIGS. 12B to 12D, the mounting head 50 is the form of a column, and in the shape of a keyway, a slotted shaft, a spline or a gear please refer to FIGS. 13A to 13D, the side of the mounting head 50 facing the workpiece 80 includes an assembling groove 51, and the assembling groove 51 can be in the types of keyway, slotted shaft, spline or gear.

The above is the configuration description of the main components of each embodiment of the present invention. As for the operation mode and effect of the present invention, please refer to the description as follows:

When the controller 12 includes an absolute encoder, the actuation method of the present invention includes a step sleeving and a step of orienting:

For the step of sleeving, please refer to FIGS. 3 to 6. First, the workpiece 80 is approached to the front of the mounting head 50 along the axis X using the method of an automated production line, a robot or a user's hand-held. Due to the groove 81 is a square groove, and the mounting head 50 is a square joint, the groove 81 and the mounting head 50 must be set at exactly the same angle in order to fit the workpiece 80 on the mounting head 50. When the angle of the groove 81 does not match the angle of the mounting head 50, please refer to FIG. 3-4, the workpiece 80 will abut against the mounting head 50 and drive the orientation head 30 to move backward along the axial direction X, then the blocking member 40 fixed to the orientation head 30 is caused to move away from the sensing unit 61. When the distance between the blocking member 40 and the sensing unit 61 changes, the sensing unit 61 is triggered to send a driving signal to the controller 12 to activate the transmission motor 11. When the transmission motor 11 is activated, the rotating shaft 111 drives the rotating seat 20 and the orientation head 30 to rotate. When the orientation head 30 rotates until the angle of the mounting head 50 matches the workpiece 80, please refer to FIGS. 5-6, the kinetic energy of the elastic member 70 pushes the orientation head 30 to move forward along the axial direction X and reset, so that the mounting head 50 disposed on the orientation head 30 extends into the groove 81 to complete the sleeving operation of the workpiece 80. At this time, the blocking member 40 approaches the sensing unit 61 again, triggering the sensing unit 61 to send a driving signal to the controller 12 again to stop the transmission motor 11 from operating.

In the step of orientating, when the transmission motor 11 rotates, a feedback parameter is sent to the controller 12 to know the rotation angle in the step of sleeving. The controller 12 receives the external parameters input by the user from the outside. The external parameter is a preset angle. The controller 12 calculates the compensation angle according to the rotation angle and the preset angle, and then controls the transmission motor 11 to rotate according to the compensation angle, so that the mounting head 50 rotates to the preset angle to accurately position the angle of the workpiece 80.

Figure 15:
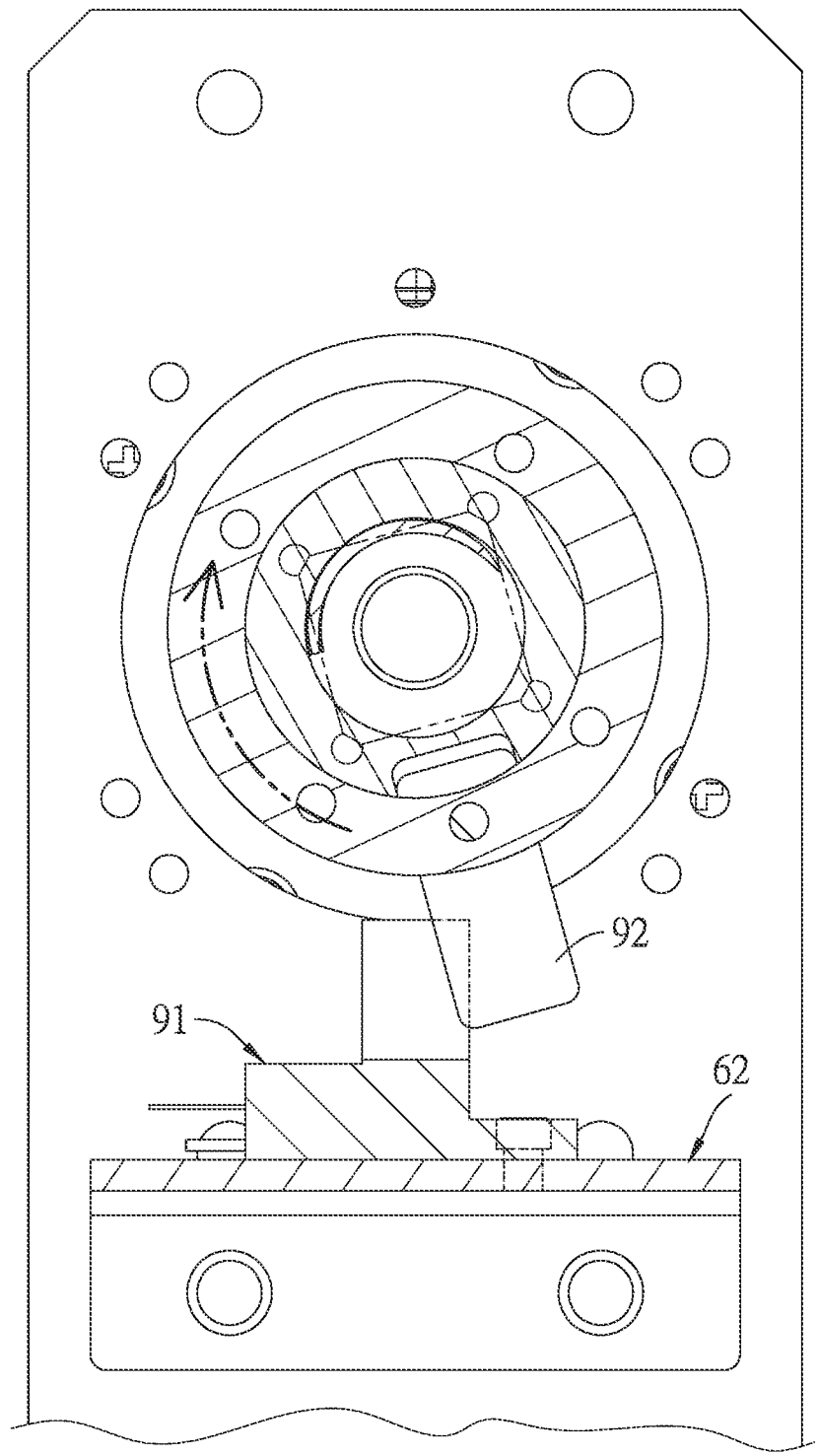
FIG. 15 is a schematic diagram of the angle sensing member entering the shielding space.
Figure 16:
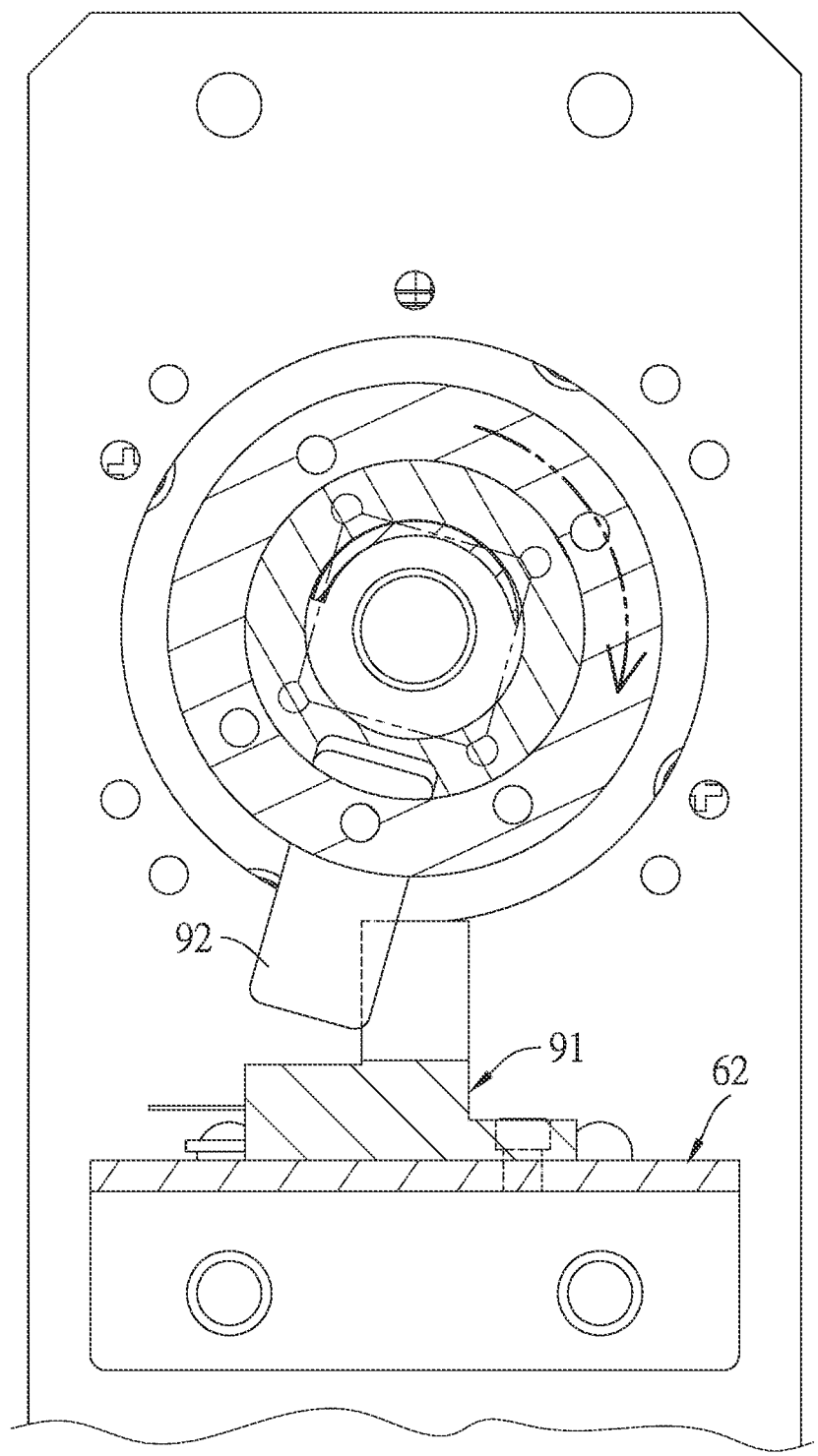
FIG. 16 is a schematic diagram of the angle sensing member leaving the shielding space.

When the controller 12 includes an incremental encoder, there is an additional reset step before the sleeving step. Please refer to FIGS. 8, 15 to 16, the controller 12 drives the transmission motor 11 to rotate to further rotate the angle sensing member 92 to the shielding space 913 of the angle sensor 91 to obtain the initial angle.

In the orientating step, the compensation angle is calculated by referring to the initial angle, the rotation angle and the preset angle.

Accordingly, the present invention uses the orientation head 30 to move along the axial direction X to drive the blocking member 40 to approach or move away from the sensing unit 61 of the sensor 60, so as to make the sensing unit 61 send a driving signal to the controller 12 to turn on of turn off the transmission motor 11, so that the workpiece 80 is smoothly sleeved on the mounting head 50. When the transmission motor 11 is activated, a feedback parameter is sent to the controller 12 to know a rotation angle of the transmission motor 11, and the controller 12 receives the preset angle input from the outside and calculates the compensation angle according to the rotation angle and the preset angle, and then controls the transmission motor 11 to rotate according to the compensation angle, so that the mounting head 50 rotates to preset angle to accurately position the angle of workpiece 80.

What is claimed is:

1. A workpiece orientation mechanism comprising:
a driving device including a transmission motor and a controller which are connected with each other via signal, the transmission motor defining an axial direction;
a rotating seat, combined with the transmission motor, and capable of being driven to rotate by the transmission motor;
an orientation head disposed on the rotating seat to rotate synchronously with the rotating seat, wherein the orientation head is capable of moving along the axial direction relative to the rotating seat, one end of the orientation head includes a mounting head, and a blocking member is disposed on the orientation head;
reset means, arranged between the rotating seat and the orientation head, and positioning the orientation head at a predetermined position; and
a sensor facing the blocking member, wherein the sensor is signally connected with the controller;
wherein the transmission motor includes a rotating shaft;
the rotating seat includes a penetrating hole, the rotating shaft is inserted through and locked in the penetrating hole, the rotating seat includes an elastic member fixing portion, the reset means is an elastic member, and one end of the elastic member is fixed to the elastic member fixing portion;
the orientation head includes a locking portion, a blocking member coupling portion, and an elastic member receiving portion, the locking portion is a columnar body and extends along the axial direction, two ends of the locking portion along the axial direction are respectively a first end and a second end, the first end is provided with the mounting head, the elastic member receiving portion is located at the second end, another end of the elastic member is fixed to the elastic member receiving portion, the blocking member is disposed on the blocking-member inductor coupling portion;
the sensor includes a sensing unit that faces the blocking member, and the sensing unit is signally connected to the controller;
wherein, when a workpiece abuts the mounting head to move the orientation head and the blocking member along the axial direction, the sensor transmits a driving signal to the controller to drive the transmission motor, and the transmission motor drives the rotating seat, the orientation head, and the blocking member to rotate by a rotation angle, so that the mounting head engages the workpiece, meanwhile, the reset means causes the orientation head and the blocking member to return along the axial direction, and makes the sensor send the driving signal to the controller to stop the transmission motor, and the transmission motor sends a feedback parameter to the controller to obtain the rotation angle, and the controller calculates a compensation angle based on the rotation angle and a predetermined angle, and then drives the transmission motor to rotate by the compensation angle.

2. The workpiece orientation mechanism as claimed in claim 1, wherein the controller includes an absolute encoder.

3. The workpiece orientation mechanism as claimed in claim 1, wherein the transmission motor is mounted on a motor fixing base, the rotating seat includes a first sleeve and a first orientation member;
the first sleeve is sleeved on the rotating shaft, the penetrating hole penetrates the first sleeve, the first sleeve includes a first side surface facing away from the motor fixing base, the first side surface includes a flange, the elastic member fixing portion is a first accommodating groove defined by the flange, the first accommodating groove communicates with the penetrating hole, and a diameter of the first accommodating groove is larger than that of the penetrating hole, thereby forming an annular step surface at a junction between the first accommodating groove and the penetrating hole for one end of the elastic member to abut against;
the first orientation member includes a body disposed on the first side surface and coaxially arranged with the first sleeve, the body includes an elastic member accommodating hole penetrating the body along the axial direction, the elastic member is disposed in the elastic member accommodating hole, two through holes are respectively formed at two ends of the body in the axial direction and communicate with the elastic member accommodating hole, the locking portion extends out of the through holes and protrudes from the first orientation member, two openings are respectively formed at two radial ends of the body and communicate with the elastic member accommodating hole;
the orientation head further includes a sliding portion formed at the second end of the locking portion, the sliding portion is disposed in the elastic member accommodating hole, the blocking-member coupling portion is two protrusions at two opposite sides of the sliding portion, the two protrusions are located on a radial extension line of the locking portion and respectively protrude from the openings, the sliding portion includes a front side surface and a rear side surface facing away from the front side surface, the front side surface is connected to the second end, the elastic member receiving portion is a second accommodating groove located on the rear side surface, and another end of the elastic member is abutted against the second accommodating groove;
the blocking member is an annular plate sleeved on the first orientation member and disposed on the two protrusions;
the driving device further includes a supporting plate which is locked to the motor fixing base, and the sensor is disposed on the supporting plate.

4. The workpiece orientation mechanism as claimed in claim 3, wherein the supporting plate includes a first plate section, a second plate section, and a third plate section which are connected to each other in sequence, a first angle is formed between the first plate section and the second plate section, a second angle is formed between the second plate section and the third plate section, the first plate section is fixed to the motor fixing base, the third plate section faces the sensing element, and the sensor is combined with the third plate section.

5. The workpiece orientation mechanism as claimed in claim 3, wherein the elastic member accommodating hole includes two opposite inner surfaces which are flat surfaces, the sliding portion includes a top fixing side portion and a bottom fixing side portion on opposite sides thereof, the top fixing side portion and the bottom fixing side portion are flat surfaces, and respectively abut against the corresponding inner surfaces.

6. The workpiece orientation mechanism as claimed in claim 3, wherein the controller includes an incremental encoder, and further includes an angle sensor unit, the angle sensor unit includes an angle sensor and an angle sensing member, the angle sensor is disposed on the supporting plate, the angle sensor is signally connected to the controller, and includes alight projecting unit and a light receiving unit, the light projecting unit and the light receiving unit are separated by a distance to form a shielding space, the angle sensing member is disposed between the first sleeve and the first orientation member, and is able to rotate with the rotating seat.

7. The workpiece orientation mechanism as claimed in claim 6, wherein the supporting plate includes a first plate section, a second plate section, and a third plate section which are connected to each other in sequence, a first angle is formed between the first plate section and the second plate section, a second angle is formed between the second plate section and the third plate section, respectively, the angle sensor is disposed on the second plate section, the first sleeve is recessed with a receiving groove on the first side surface, and the angle sensing member is locked in the receiving groove.

8. The workpiece orientation mechanism as claimed in claim 1, wherein the transmission motor is mounted on a motor fixing base, the rotating seat includes a second sleeve and a second orientation member; the second sleeve is sleeved on the rotating shaft, the penetrating hole penetrates the second sleeve, the second sleeve includes a sleeve portion, a body portion, and a first column, the sleeve portion and the first column are respectively connected to two opposite side of the body portion along the axial direction, the sleeve portion is sleeved on the rotating shaft, the body portion includes a second side surface facing away from the motor fixing base, the first column is connected to the second side surface, the first column is the elastic member fixing portion, and one end of the elastic member is sleeved on the first column; the second orientation member includes a first side plate, a bottom plate, and a second side plate which are connected to one another in sequence, the bottom plate is located between the first side plate and the second side plate, the first side plate, the bottom plate, and the second side plate define an accommodating space, the first column penetrates the first side plate and extends into the accommodating space, the first side plate is combined with the body portion, and the second side plate includes a mounting head hole, the second side plate includes a mounting surface which faces the first side plate, and the elastic member is disposed in the accommodating space; the first end of the locking portion extends out of the second orientation member via the mounting head hole, the inductor coupling portion is located at the second end, the inductor coupling portion is a locking block extending from one side of the locking portion, the elastic member receiving portion is a second column protruding from the second end, and another end of the elastic member is sleeved on the second column; the inductor is a plate and includes a locking section and a shielding section connected to each other, the locking section is fixed to the locking block, and the shielding section faces the sensor.

9. The workpiece orientation mechanism as claimed in claim 3, wherein the first end of the locking portion includes a receiving slot, and the mounting head is disposed in the receiving slot.

10. The workpiece orientation mechanism as claimed in claim 8, wherein the first end of the locking portion includes a receiving slot, and the mounting head is disposed in the receiving slot.

* * * * *